United States Patent [19]

Irelan

[11] Patent Number: 4,842,325
[45] Date of Patent: Jun. 27, 1989

[54] TOWABLE CAMPER

[75] Inventor: John A. Irelan, Elkhart, Ind.

[73] Assignee: Coachmen Industries, Inc., Middlebury, Ind.

[21] Appl. No.: 111,866

[22] Filed: Oct. 23, 1987

[51] Int. Cl.⁴ .............................................. B60J 5/04
[52] U.S. Cl. ...................................... 296/146; 296/27; 49/254; 280/166; 280/164.1
[58] Field of Search ................ 296/146, 27, 26, 24 R, 296/57 R, 37.1; 280/164 R, 166; 49/254, 255, 257

[56] References Cited

U.S. PATENT DOCUMENTS

| | | | |
|---|---|---|---|
| 3,078,117 | 2/1963 | Martini | 296/27 |
| 3,265,433 | 8/1966 | Shea | 296/57 R |
| 3,400,974 | 9/1968 | Gage | 296/146 |
| 3,468,580 | 9/1969 | Arnold et al. | 296/146 |
| 3,495,866 | 2/1970 | Bontrager | 296/27 |

Primary Examiner—Robert R. Song
Attorney, Agent, or Firm—James D. Hall; Thomas J. Dodd; Todd A. Dawson

[57] ABSTRACT

A towable vehicle which includes a pivoting access door. The access door is connected to the vehicle frame for pivotal movement between a vertical closed position, and a horizontal, open position wherein the door is supported by the vehicle frame and acts as a step. The vehicle may also include a storage access door which slides outwardly of the vehicle then pivots along an axial arm to provide access to a storage compartment.

8 Claims, 11 Drawing Sheets

TOWABLE CAMPER

FIELD OF THE INVENTION

This invention relates to vehicles, and will have application to recreational type vehicles such as a lightweight pop-up type camper.

BACKGROUND OF THE INVENTION

Towable campers have long been popular vheicles for the outdoor recreationalist. In recent years, pop-up campers have become very popular in that they allow for adequate storage of gear and accessories while maintaining an efficient aerodynamic profile during road travel. A main drawback to such campers is their weight which due to mechanical lifts and other parts is so increased that many underpowered vehicles are incapable of towing the camper. Often a camping enthusiast has to purchse a smaller camper than is actually needed due to the limited towing ability of the family automobile. Other drawbacks of prior campers are limited interior access and limited access to the stored LP gas bottles.

SUMMARY OF THE INVENTION

The vehicle of this invention is of a monocoque, or unibody, construction. The roof is preferably formed of a single sheet of material which is of a lightweight construction. The camper side walls are formed of lightweight polyurethane panels which are connected to the vehicle frame to form a lighter, more durable camper than was previously produced.

The vehicle also includes an improved access door to its LP gas bottles, and further includes a vertically pivotal side access door which converts into a step and allows the vehicle to retains its sleek aerodynamic appearance during road travel.

Accordingly, it is an object of this invention to provide for a lightweight towable camper which may be towed by more automotive vehicles than a similar size camper of conventional construction.

Another object of this invention is to provide for a towable camper which is durable and dent resistant.

Another object of this invention is to provide for a pop-up camper which efficiently seals the interior of the camper against the elements.

Still another object of this invention is to provide a camper door which allows efficient access to the camper interior while maintaining a sleek aerodynamic look during periods of road travel.

Other objects of this invention will become readily apparent upon a reading of the following description.

BRIEF DESCRIPTION OF THE DRAWINGS

A preferred embodiment of the invention has been depicted for illustrative purposes wherein.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize the invention.

Referring now to the drawings, and in particular to FIGS. 1-5, reference numeral 10 generally designates a towable vehicle. Vehicle 10 is illustrated as a towable camper which includes a top or roof section 12 which may be placed in lowered and raised positions during travel and camping. The system for raising and lowering roof 12 is well known in the art and is not shown in the drawings and will not be described in this description.

Figure 1:
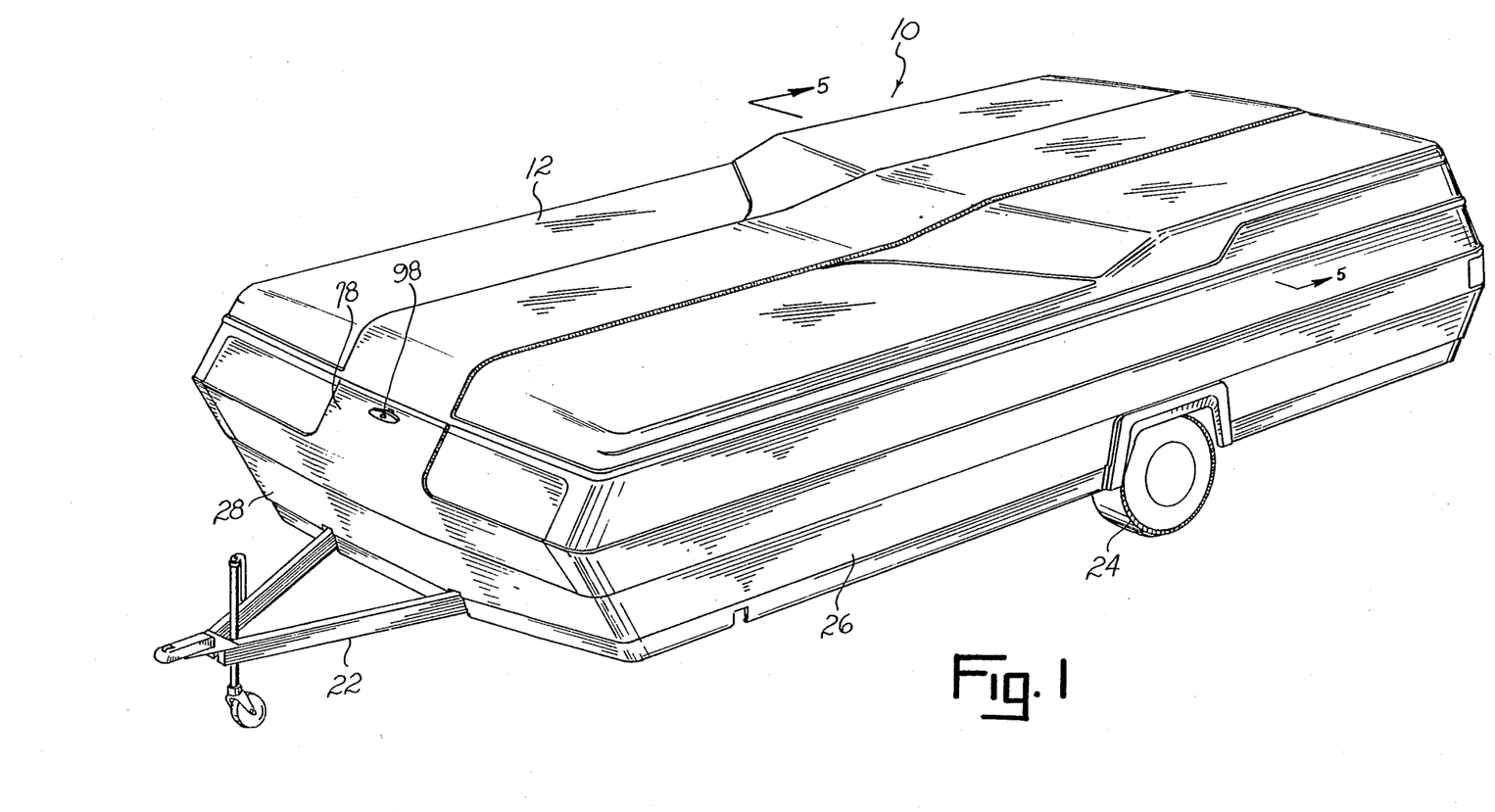
FIG. 1 is a perspective view of the camper of this invention in its travel position.
Figure 2:
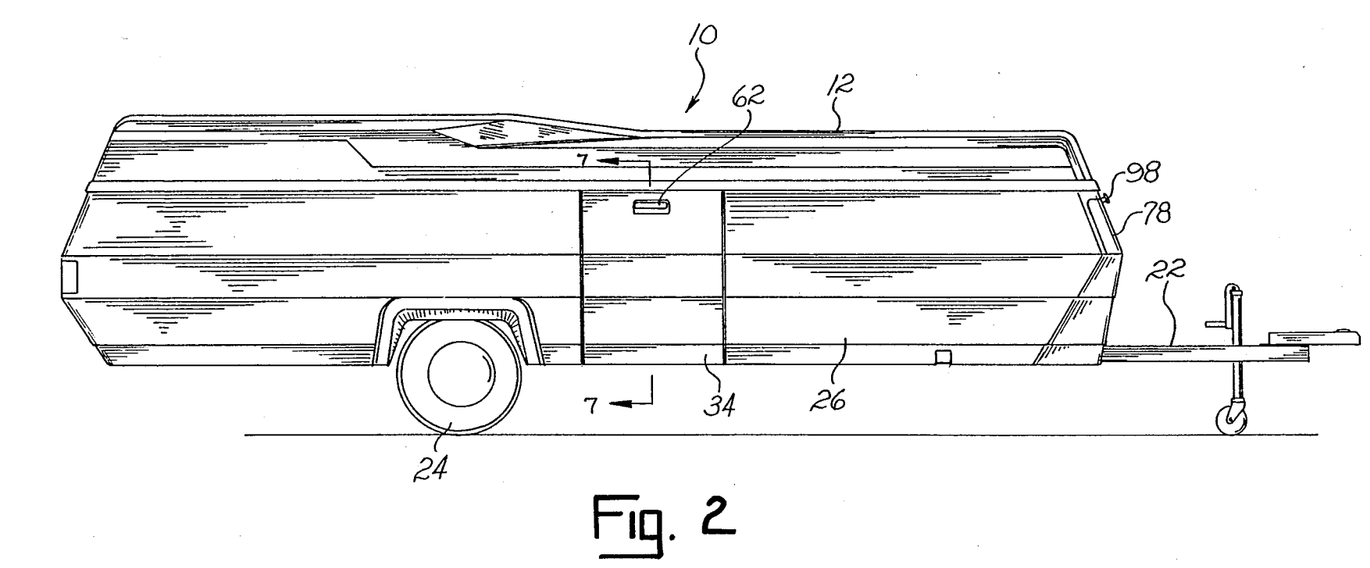
FIG. 2 is a side elevation view of the camper in its travel position.
Figure 3:
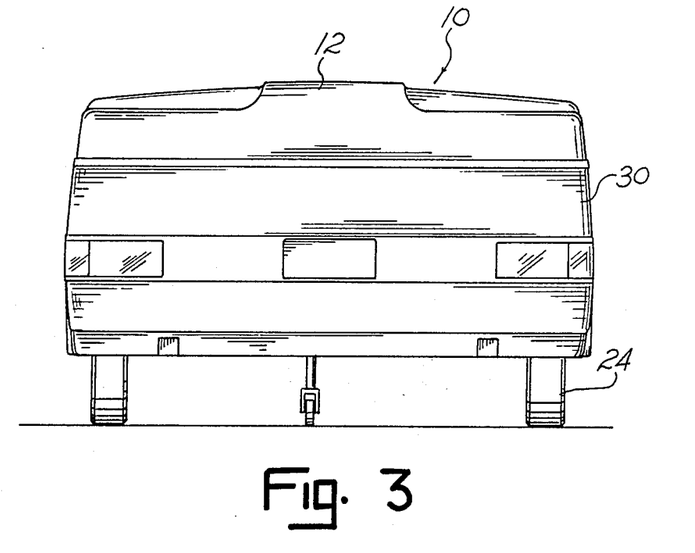
FIG. 3 is a rear elevation view of the camper in its travel position.
Figure 4:
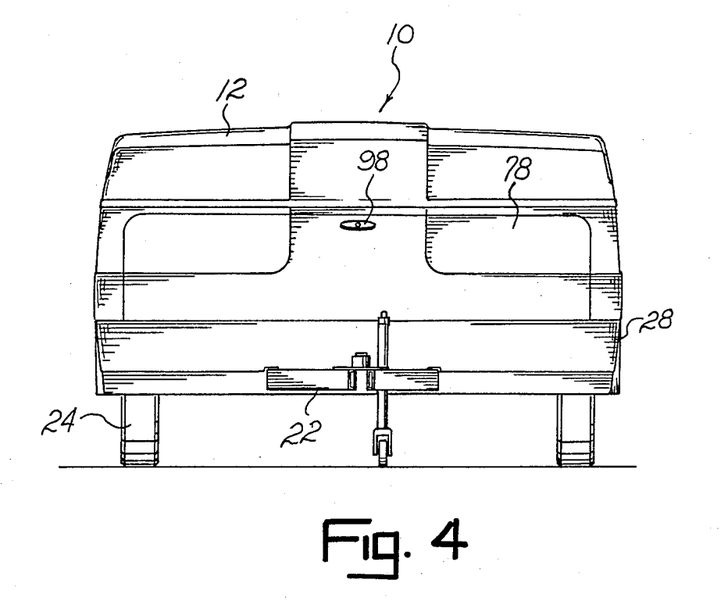
FIG. 4 is a front elevation view taken of the camper in its travel position.
Figure 5:
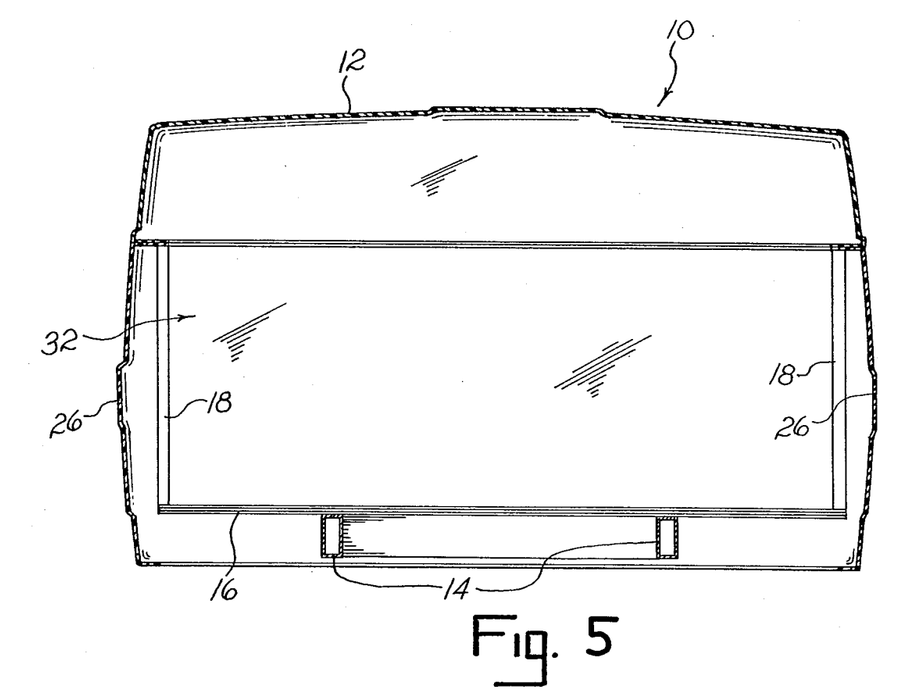
FIG. 5 is a sectional view taken along line 5—5 of FIG. 1.

Vehicle 10 is shown in cross-section in FIG. 5, and includes a chassis 14 having spaced T-beam members. Other conventionally available chassis may be utilized. Vehicle 10 also includes a floor 16, with vertical frame members 18 secured to and extending upwardly of the floor to cooperate with a lift system (not shown) in supporting roof section 12. A conventional type hitch 22 allows connection to a towing vehicle (not shown) and wheels 24 facilitate transport of vehicle 10 from camp site to camp site.

Camper 10 further includes side walls 26 and front and rear walls 28 and 30. Side walls 26 and end walls 28, 30 are preferably of a monocoque construction which is known in the vehicle building art, particularly among commercial automobile manufacturers. Each wall 26, 28, 30 is preferably formed of an elastomeric skin (usually urethane with chopped glass formed by the well-known RIM process) which sandwiches a lightweight insulative urethane foam and is connected to frame members 18 to form enclosed living quarters 32. Roof 12 is also formed of a monocoque construction similar to walls 26–30.

Figures 6, 15:
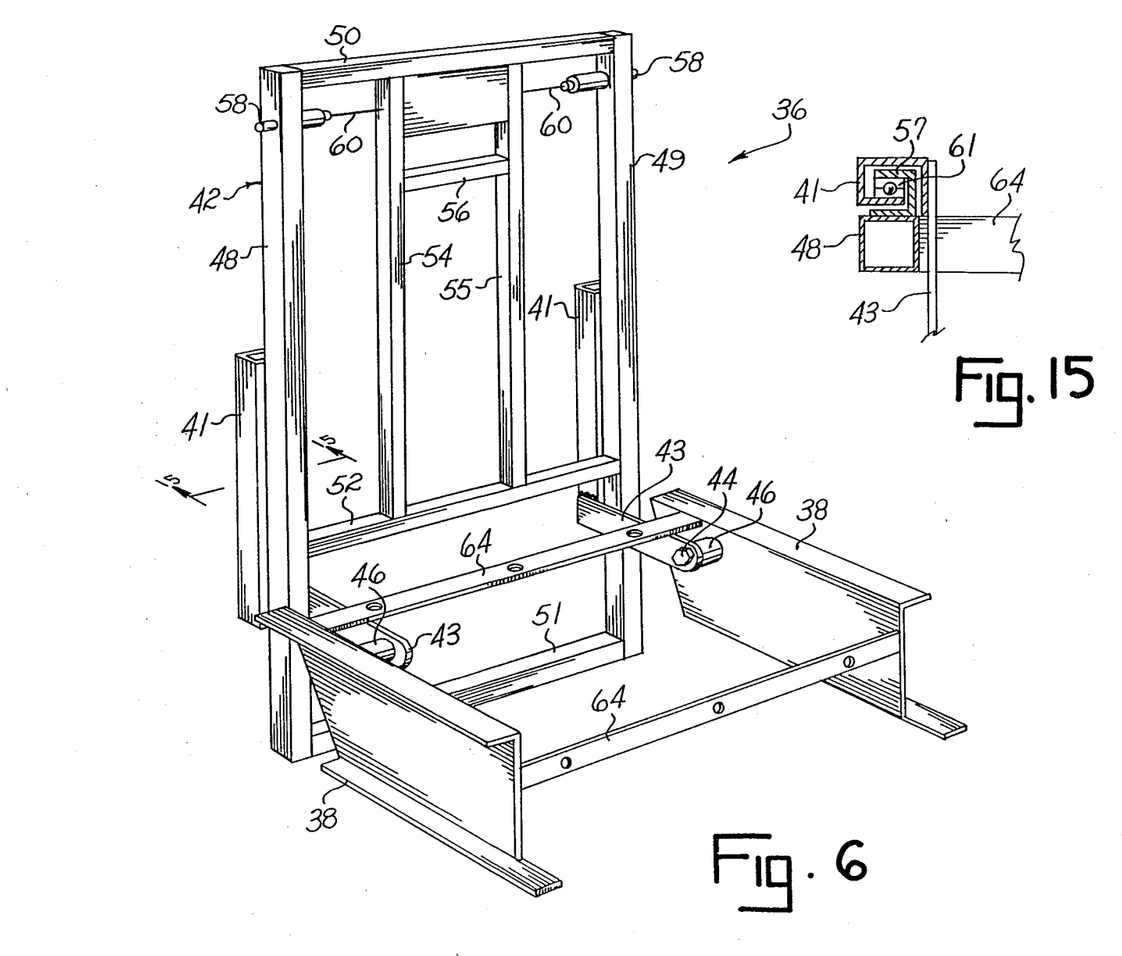
FIG. 6 is a perspective view of the side access door mechanism.
FIG. 15 is a sectional view taken along lines 15—15 of FIG. 6.

Access to living quarters 32 is gained through a door 34 located along one side wall 26. Door 34 includes a frame 36, shown in detail in FIG. 6. Frame 36 includes spaced support bracketss 38 (also shown) which are secuted to chassis 14 alternating to floor 16 by welding or other suitable means. A door frame 42 which supports a skin 40 of the monocoque construction like walls 26–30 is pivotally connected to brackets 38 through peripheral supports or studs 41 connected to arms 43 which are pivotally fastened to the brackets through bolts 44 and spacer bushings 46. Door frame 42 includes spaced vertical outer frame members 48, 49 and spaced horizontal outer frame members 50, 51 which form a substantially rectangular shaped door frame as shown in the drawings. Door frame 42 further includes an inner horizontal frame member 52 which extends between frame members 48, 49 above arms 43 and inner vertical frame members 54, 55 which extend between frame members 52 and 50. A horizontal frame member 56 may be extended between frame member 54, 55 if desired to provide additional support and to allow a door lock member 59 to be recessed. It should be noted that, to insure efficient operation of door 34, door frame 42 should be slidable relative to supports or studs 41. As shown in FIG. 15, slidable operation is achieved by a U-shaped connector rod 57 connected to vertical frame members 48, 49 and through bearing block 61 to studs or supports 41.

Lock member 59 is formed of latch pins 58 connected by cables 60 to a pivotal latch 62, and is secured to door frame 42 as shown. Each pin 58 is preferably biased by an internal spring (not shown) to hold the pin in a normally exended lock position shown in FIGS. 6–7. Slats 64 extend between and are connected to brackets 38 to provide additional support for frame 36.

Figure 7:
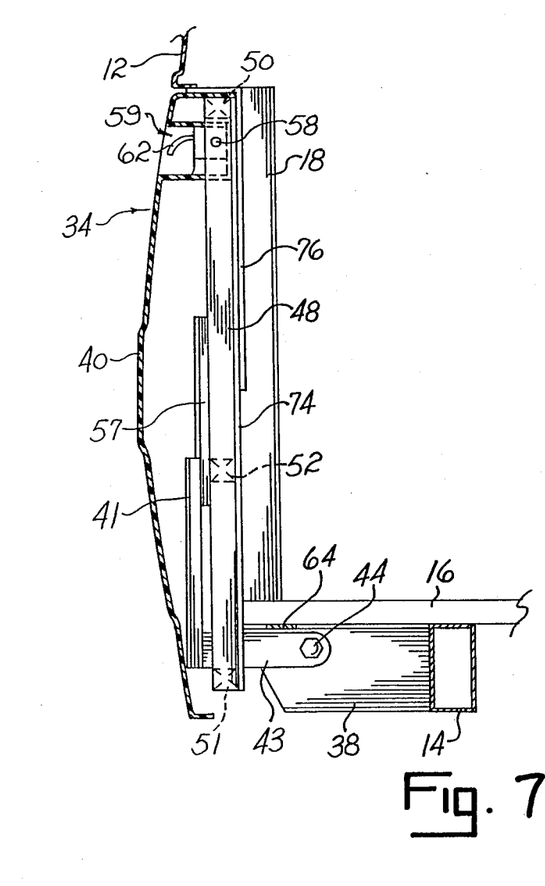
FIG. 7 is a vertical sectional view of the side door in the closed position as seen along line 7—7 of FIG. 2.
Figure 8:
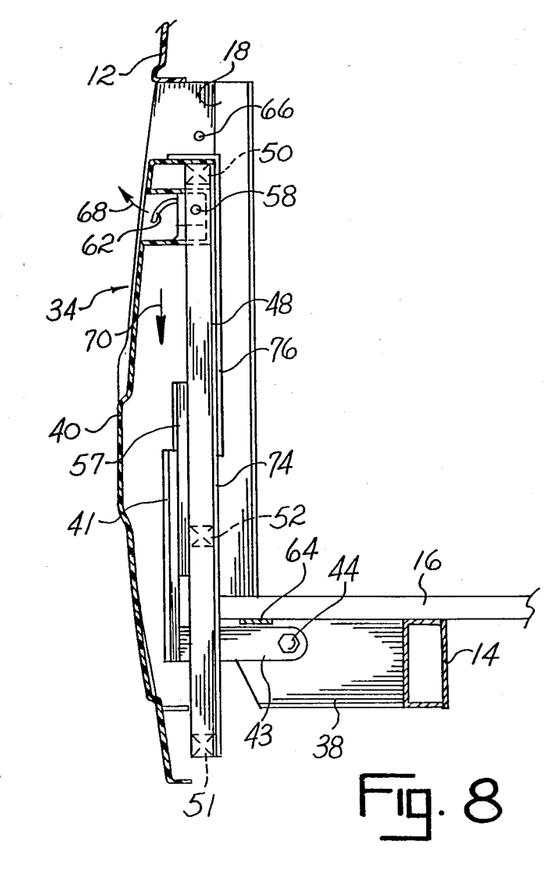
FIGS. 8-10 are sequential views of the side door shown in vertical section, which illustrate the movement of the door panel and mechanism from its closed position to its fully open position.
Figure 9:
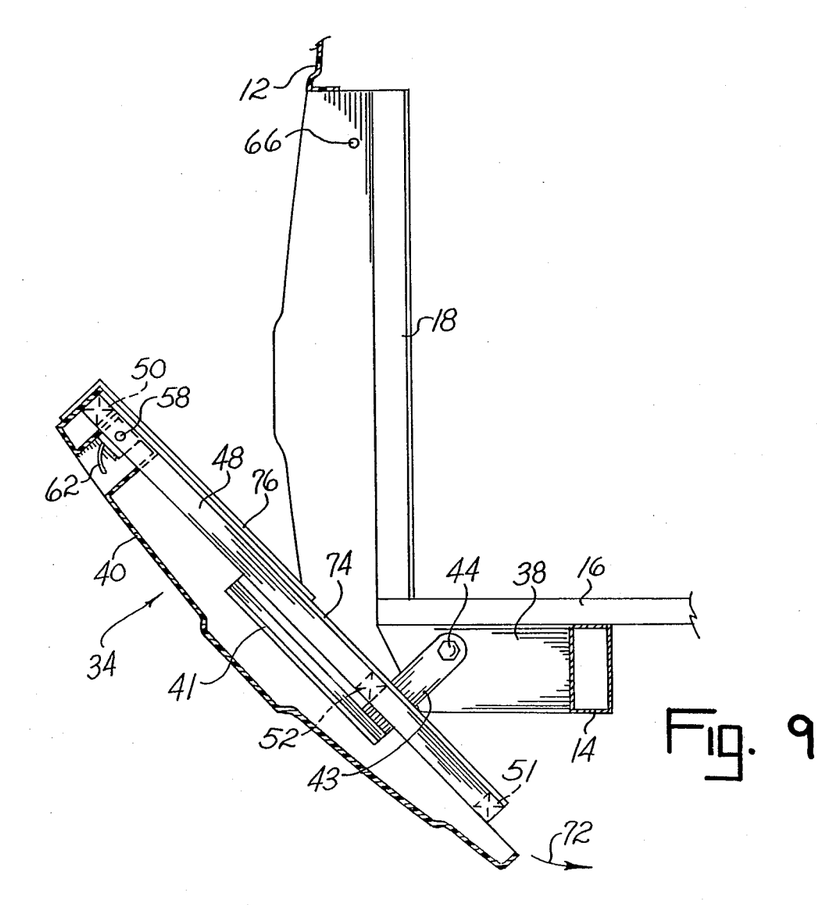
Figure 10:
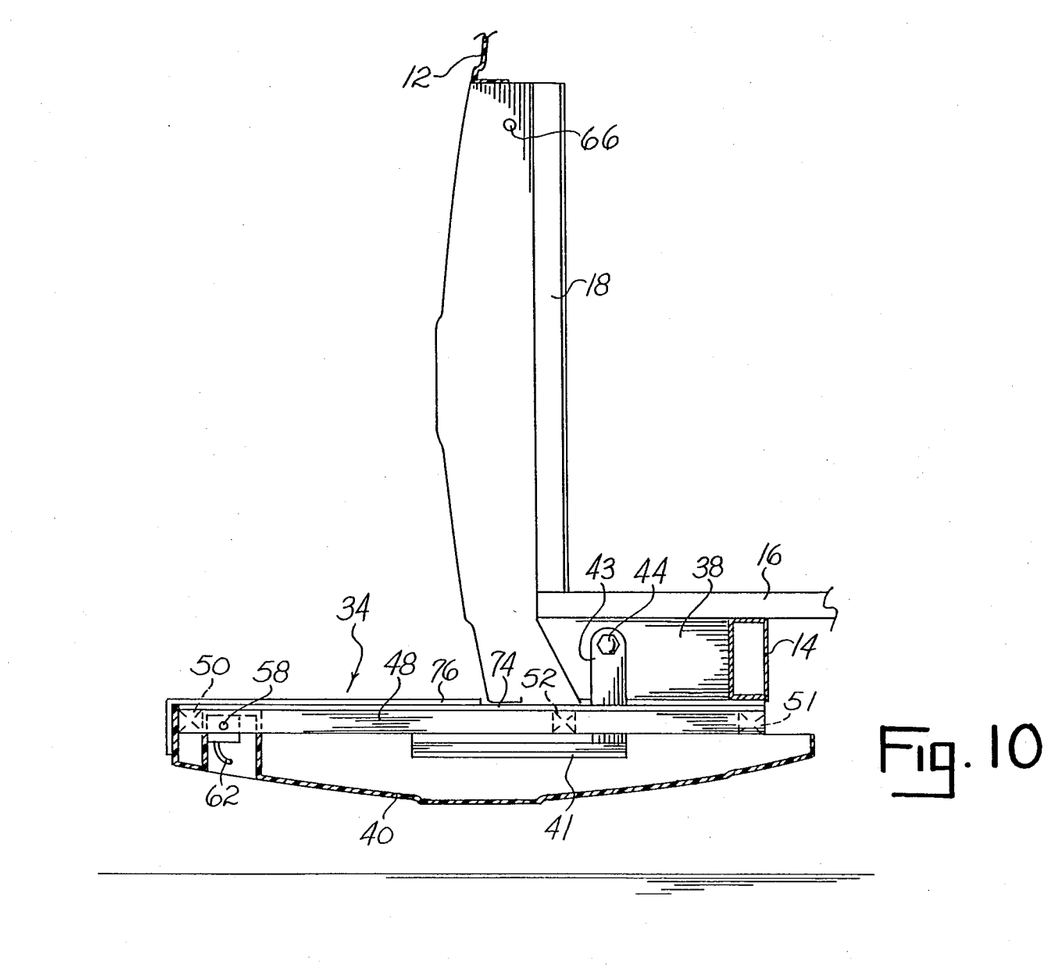
Figure 11:
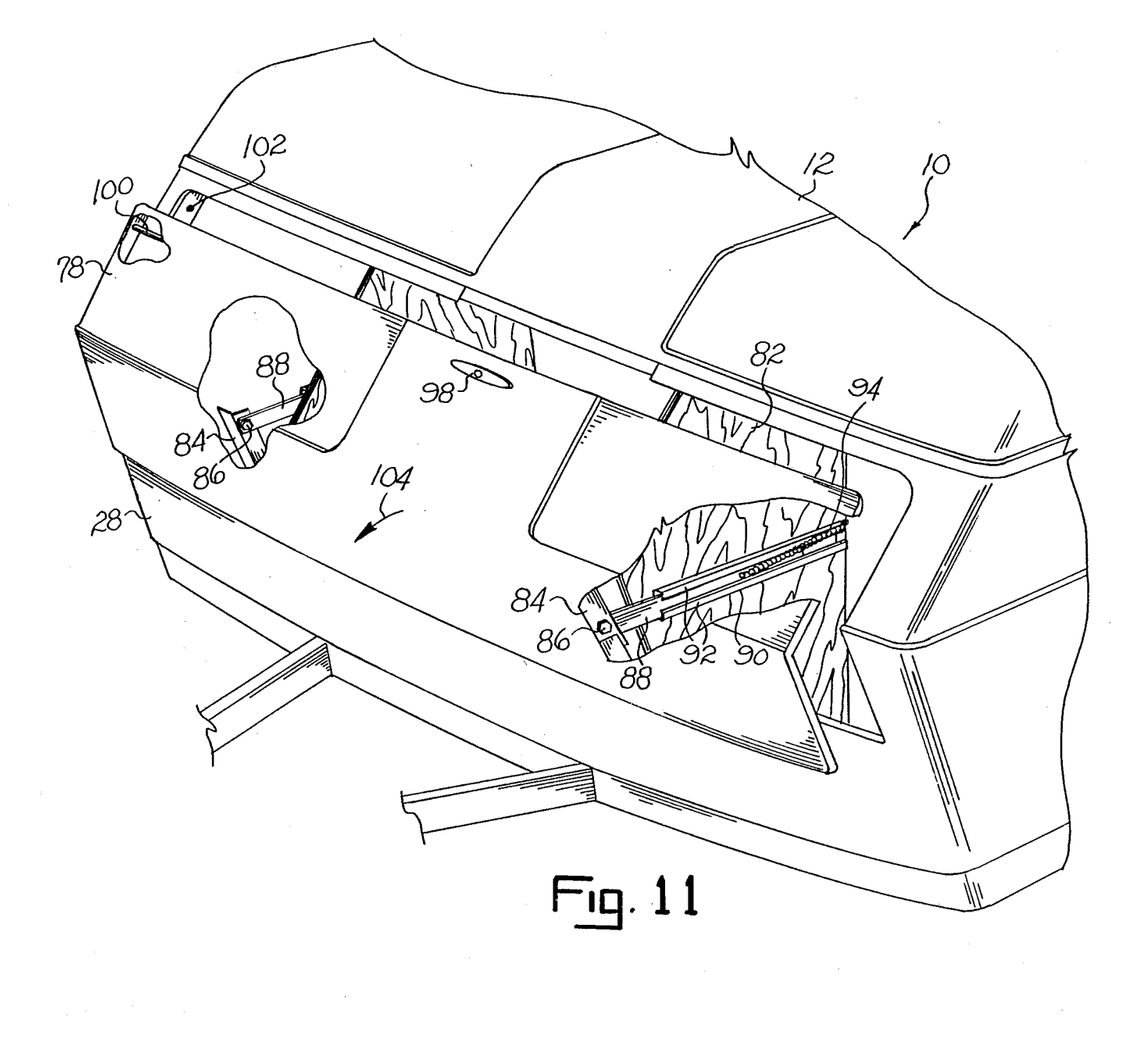
FIG. 11 is a fragmentary front perspective view of the camper showing the front access door being opened with portions of the door cut away for illustrative purposes.
Figure 12:
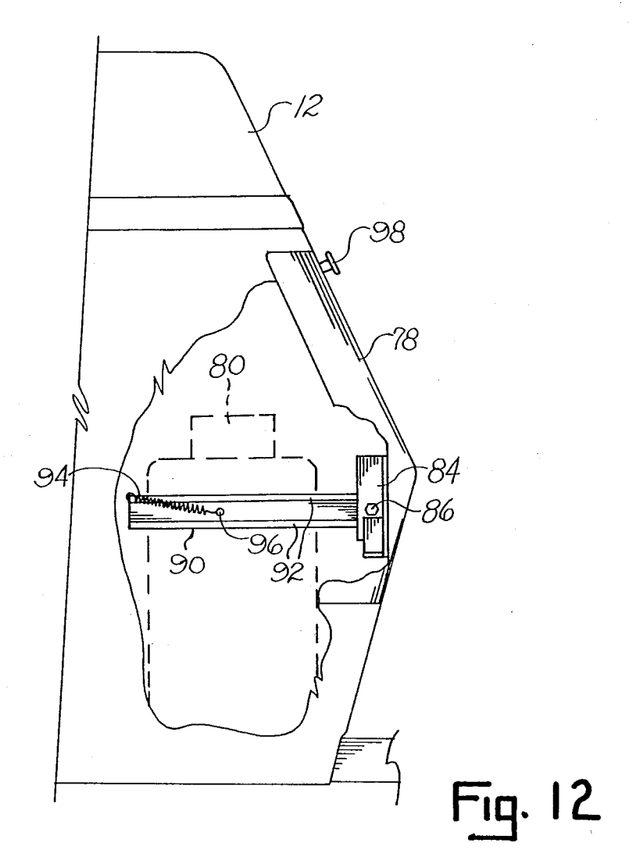
FIGS. 12-14 are sequential views of the front access door shown in side elevation which illustrate movement of the door from its closed position to its fully open position.
Figure 13:
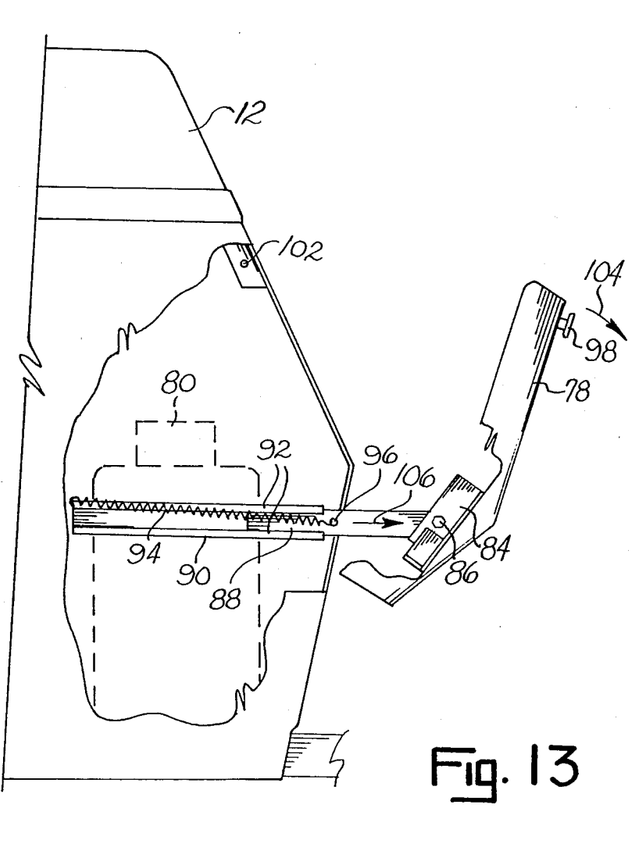
Figure 14:
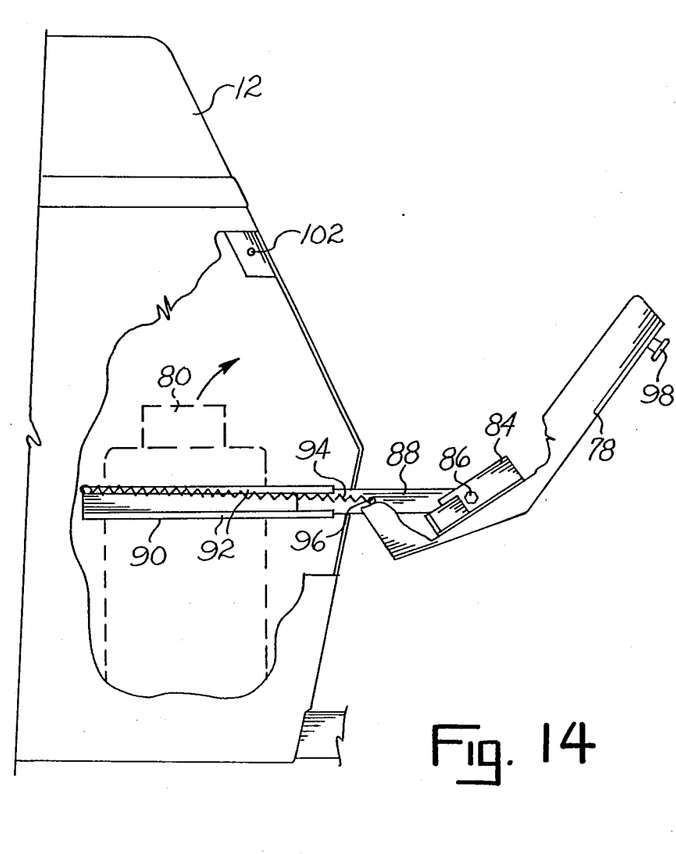

Sequential operation of door 34 is shown in FIGS. 7–10. In FIG. 7, the door 34 is shown in teh closed position with pins 58 extending into bores 66 in camper vertical frame members 18. To open door 34, a user first pulls latch 62 in the direction of arrow 68 (FIG. 8) which causes cables 60 to draw pins 58 inwardly out of frame bores 66. Door frame 42 is then allowed to slide downwardly in the direction of arrow 70 until frame member 52 contacts pivot arms 43 to halt downward movement of the door frame. At this point, door frame 42 is lowered further by pivotal movement along an axis defined by bolts 44 in the direction of arrow 72 (FIG. 9). Finally, FIG. 10 illustrates the fully opened position of door 34, with horizontal frame member 51 supported in the substantially horizontal position shown by contact with chassis 14. In this position (FIG. 10), access is gained to living quarters 32 thrugh an opening in side wall 26 with the upper portion 74 of inner door skin 40 being exposed and serving as a step into the living quarters. A reinforcement member 76 of suitable material may be secured to inner door skin portion 74 to protect its appearche and structural integrity when in use as a step. Door 34 is closed by simply lifting up on latch 62 and/or frame member 50 to pivot the door into its closed position with latch 62 turned to retract pins 58 and then releasing latch 62 to allow pins 58 to extend into frame bores 66.

FIGS. 11–14 depict the front access panel door 78 of camper 10 which allows access to the front of the camper where LP gas containers 80 and other supplies may be stored between front end wall 28 and interior divider wall 82. Access panel 78 is pivotally connected by brackets 84 and bolts 86 to arms 88. Guide members 90 extends outwardly from and are secuted to interior wall 82. One guide member 90 is provided for each arm 88 and is preferably of the C-shaped construction shown with opposed flanges 92 which slidably retain arm 88. A spring 94 is connected between guide member 90 and arm 88 at a pin 96 to bias movement of access panel 78 from its opened (FIG. 14) into its closed (FIG. 11) positions. Spring 94 can also serve as a stop to limit the extent of opening movement of panel 78.

To open access panel 78 to expose gas containers 80 for removal, a user first unlocks the panel by twisting T-handle 98 to withdraw latch pins 100 from frame bores 102. It is here understood that many types of security devices may be used to latch access panel 78 in the closed position. The latch chosen is well known in the art and is depicted for illustrative purposes only. After unlocking, the user pulls handle 98 to open panel 78 by the sliding movement of arms 88 in the direction of arrow 106 (FIG. 13) within guide members 90. By pivoting access panel 78 in the direction of arrow 104 (FIGS. 11 and 13) about bolts 86 in plates 84, the panel may reach its fully opened position (FIG. 14) to allow removal of containers 80 or other articles stored therein. Panel 78 is then returned to its closed position of FIG. 12 and locked in this position by pins 100 extending into frame bores 102.

It is understood that the above description does not limit the invention to the precise form disclosed, but may be modified within the scope of the following claims.

What is claimed is:

1. In combination, a towable vehicle including a frame and an outer skin which defines an interior space, and an access member pivotally connected to said vehicle frame, said access member shiftable between a closed position substantially flush with said outer skin wherein access to said interior space is denied, and an open position substantially horizontal and adjacent to said frame wherein access to said interior space is gained, said access member including support brackets connected to said frame, said access member further including a door pivotally connected to said brackets, pivot means associated with said door for allowing pivotal movement of the door between its said open and closed positions, said pivot means including spaced arms pivotally connected at corresponding ends to said brackets, a stud connected to the opposite end of each arm, said door including a frame having interconnected horizontal and vertical door frame members, said door frame including means for effecting slidable movement of the door frame with respect to the studs, said door frame including a substantially horizontal cross member extending between said door frame vertical members, said cross member constituting means when contacting said arms for stopping downward sliding motion of said door.

2. The combination of claim 1 wherein said frame includes means for supporting said door frame in its said substantially horizontal open position.

3. The combination of claim 1 wherein said door frame further includes an inner peripheral skin, said inner skin constituting step means for facilitating ingress and egress into said interior space with the door in its open position.

4. The combination of claim 1 and means for locking said access member in its closed position.

5. The combination of claim 4 wherein said vehicle frame includes upright vertical frame members, said access member lock means including latch pins extending into said vertical frame members when said door is in its closed position, and means for retracting said latch pins away from said vertical frame member whereby said door may be shifted into its closed position.

6. In combination, a towable vehicle including a frame and an outer skin which defines a peripheral storage compartment, said frame including a channel member extending into said storage compartment, and an access member for obtaining ingress and egress into said storage compartment, said access member slidable relative to said skin between a closed position flush with said skin to deny access into the storage compartment and an open position spaced from said skin to allow access into the storage compartment, said access member pivotally connected to a guide bar slidable within said channel member for axial turning to provide maximum exposure of said storage compartment.

7. The combination of claim 6 and spring means connected between said guide bar and channel member for limiting and biasing sliding movement of said guide bar and its attached access member.

8. The combination of claim 1 wherein said frame includes lower frame members supporting a floor, said access member bearing on a lower edge of a said lower frame member to support the access member in its said open position.

* * * * *